United States Patent [19]

Le Gall et al.

[11] Patent Number: 5,562,388
[45] Date of Patent: Oct. 8, 1996

[54] VEHICLE FOR TRANSPORTING AN AIRCRAFT ON THE GROUND

[75] Inventors: Joël-Yves Le Gall, Le Plessis-Robinson; Bernard Rodier, Angoulins-sur-Mer, both of France

[73] Assignee: Hydroland S.A., La Rochelle-Pallice, France

[21] Appl. No.: 146,187

[22] PCT Filed: Mar. 18, 1993

[86] PCT No.: PCT/FR93/00270

§ 371 Date: Nov. 16, 1993

§ 102(e) Date: Nov. 16, 1993

[87] PCT Pub. No.: WO93/18967

PCT Pub. Date: Sep. 30, 1993

[30] Foreign Application Priority Data

Mar. 24, 1992 [FR] France ................................. 92 03497

[51] Int. Cl.⁶ ......................................................... B60P 3/11
[52] U.S. Cl. .......................... 414/427; 414/429; 180/904
[58] Field of Search .................................. 414/426, 427, 414/428, 429, 430; 244/50; 180/904

[56] References Cited

U.S. PATENT DOCUMENTS

| | | |
|---|---|---|
| 2,798,729 | 7/1957 | Paul . |
| 2,980,270 | 4/1961 | Elliott et al. . |
| 3,078,942 | 2/1963 | Wiebe ................................ 180/904 X |
| 3,119,502 | 1/1964 | Paul . |
| 3,833,138 | 9/1974 | Dean ........................................ 414/430 |
| 4,375,244 | 3/1983 | Morin ................................... 414/429 X |
| 4,488,612 | 12/1984 | Patterson .............................. 244/50 X |
| 4,632,625 | 12/1986 | Schuller et al. ......................... 414/429 |
| 4,895,319 | 1/1990 | Bardsen et al. ...................... 414/426 X |
| 4,950,121 | 8/1990 | Meyer et al. ............................ 414/428 |
| 5,051,052 | 9/1991 | Franken et al. ......................... 414/428 |

FOREIGN PATENT DOCUMENTS

| | | |
|---|---|---|
| 5000790 | 2/1985 | WIPO ...................................... 414/430 |
| WO90/08696 | 8/1990 | WIPO . |

Primary Examiner—James W. Keenan
Attorney, Agent, or Firm—Young & Thompson

[57] ABSTRACT

A vehicle for transporting on the ground an aircraft that has front and rear undercarriage legs and wheels on at least the rear undercarriage legs. The vehicle comprises a rolling structure shaped and sized to support the aircraft with the front and rear undercarriage legs on corresponding cradles on the rolling structure. Structure (30, 34) is provided for raising and lowering the cradles. Mechanisms (44, 48, 58) are provided on only the cradles of the rear undercarriage legs, for encompassing and locking the wheels of the rear undercarriage legs without moving the plane horizontally. Each cradle (24) corresponding to a rear undercarriage leg comprises a base (44) against which the wheels on the rear undercarriage leg are applied. At least one mobile support bar (48) is adapted to be placed parallel to the base under the rear undercarriage wheels, this base (44) and bar (48) being disposed on opposite sides of a line (46) along which the rear undercarriage wheels bear on the ground. Each cradle corresponding to a rear undercarriage leg also comprises at least one mobile retaining bar (58) adapted to be placed parallel to and above the support bar (48) over a rear undercarriage wheel.

11 Claims, 4 Drawing Sheets

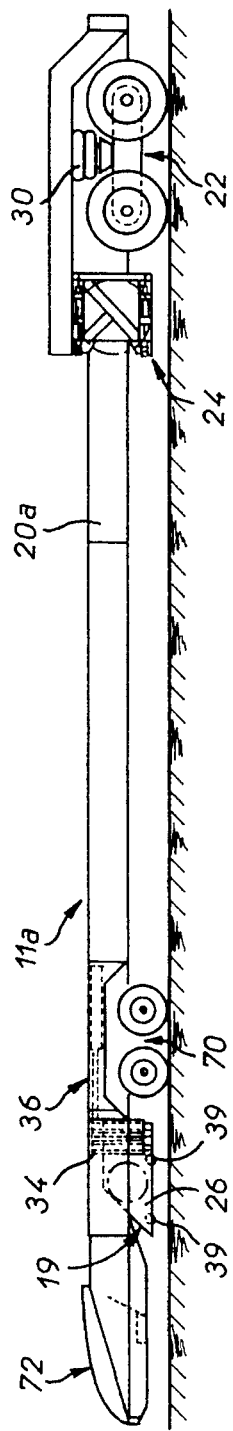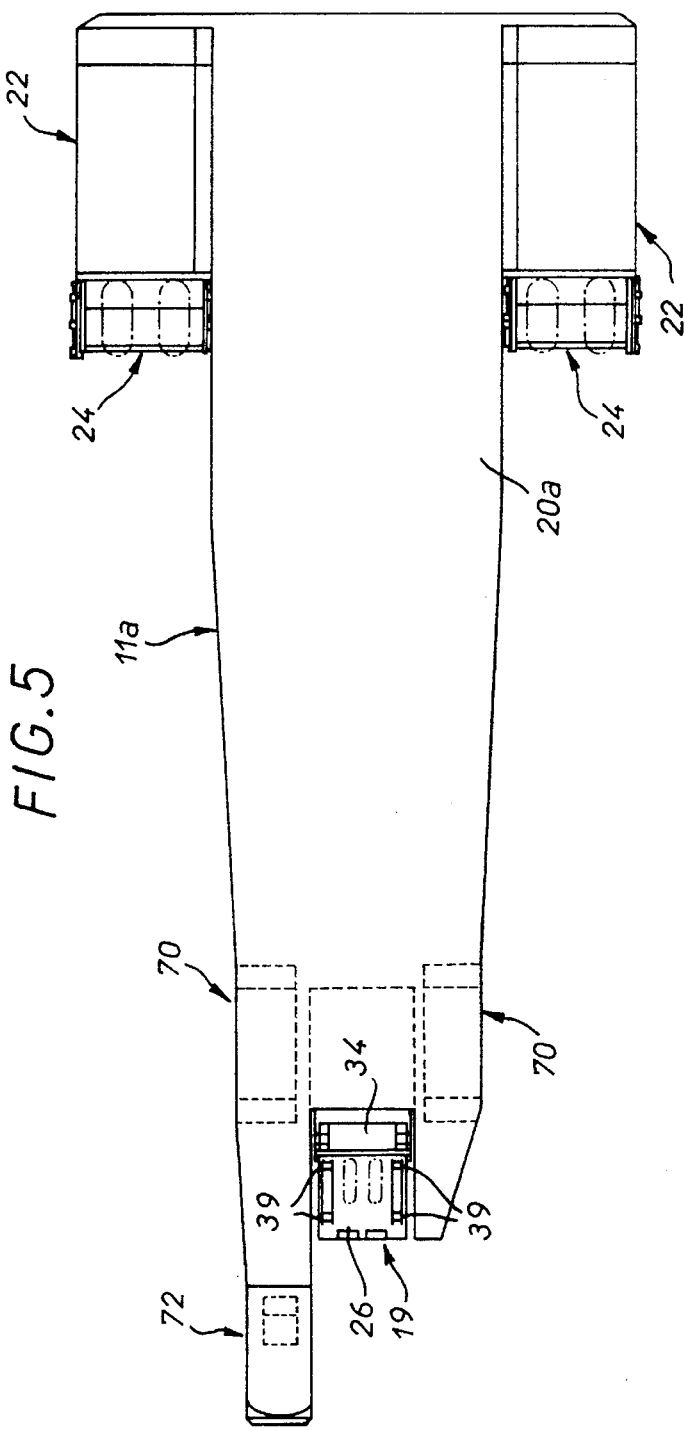
FIG. 4
FIG. 5

VEHICLE FOR TRANSPORTING AN AIRCRAFT ON THE GROUND

FIELD OF THE INVENTION

The invention concerns a vehicle for transporting aircraft on the ground as used at airports to move aircraft between various areas including boarding-disembarkation areas, maintenance areas and parking areas. The transporter vehicle in accordance with the invention allows an aircraft to be transported at high speed, in the order of 30 to 40 kilometers/hour, without applying harmful loads to particular parts of the aircraft, in particular the front undercarriage.

BACKGROUND OF THE INVENTION

It is known to couple a tractor to the front undercarriage leg of an aircraft to move the aircraft around an airport without starting its own engines. A towbar is often used between the front undercarriage leg and the tractor. Another, more complex system requiring a special vehicle takes the front undercarriage leg on board, lashing down the wheel(s). Acceleration and deceleration of the transporter vehicle always apply loads directly to the fragile front undercarriage leg. For this reason these vehicles are restricted to a speed in the order of 15 kilometers/hour for the system using a towbar or in the order of 30 kilometers/hour at most in the case of the other system. In some aircraft (especially modern wide-body aircraft) the front undercarriage leg is not strong enough for the current faster type vehicle to be used.

SUMMARY OF THE INVENTION

The invention can solve all the above problems, i.e. enable high transporting speeds to be used without applying loads to the front undercarriage leg.

The invention consists in a vehicle for transporting an aircraft on the ground characterized in that it comprises a rolling structure shaped and sized to support an aircraft with all of its undercarriage legs on said rolling structure which is provided with mechanisms for locking the main undercarriage legs so that forces caused by acceleration and deceleration of the vehicle are transmitted to said main undercarriage legs.

Because the forces caused by acceleration and deceleration of the transporter vehicle are applied to the main (rear) undercarriage legs, which are much stronger than the front undercarriage leg, it is no longer necessary to restrict acceleration and deceleration and the aircraft can be transported at much higher speed. The height of the aforementioned rolling structure is such that it can be inserted under the aircraft standing on the ground on its undercarriage legs and comprises cradles for the main undercarriage legs equipped with mechanisms for locking the main undercarriage wheels, plus a cradle for the front undercarriage leg positioned and adapted to support said front undercarriage leg. Means are provided for raising these cradles so that the aircraft is lifted a few tens of centimeters off the ground during transportation.

Note that the front undercarriage leg is virtually unrestrained on its cradle. Only vertical movement of the front undercarriage leg is restricted, for example by a strap or any like means adapted to prevent pitching of the aircraft when the transporting vehicle accelerates. The cradle onto which the front undercarriage leg is loaded advantageously has a shovel-like shape and is coupled to a vertical displacement mechanism for lifting the aircraft and preferably to a horizontal displacement mechanism for slipping the shovel under the front undercarriage wheels.

By virtue of another noteworthy feature of the invention the cradles onto which the main undercarriage legs are loaded are adapted to grip the main undercarriage wheels and pneumatic lifting means are provided between a load-bearing part of said cradles onto which the main undercarriage legs are loaded and a part including the rolling means of said vehicle.

BRIEF DESCRIPTION OF THE DRAWINGS

The invention will be better understood and other advantages of the invention will emerge more clearly from the following description of two embodiments of a vehicle in accordance with the invention for transporting aircraft on the ground given by way of example only and with reference to the appended drawings, in which:

FIG. 4 is a diagrammatic view in elevation of a second embodiment of a transporter vehicle in accordance with the invention;

FIG. 5 is a plan view of this transporter vehicle;

DETAILED DESCRIPTION OF THE INVENTION

Figure 1:
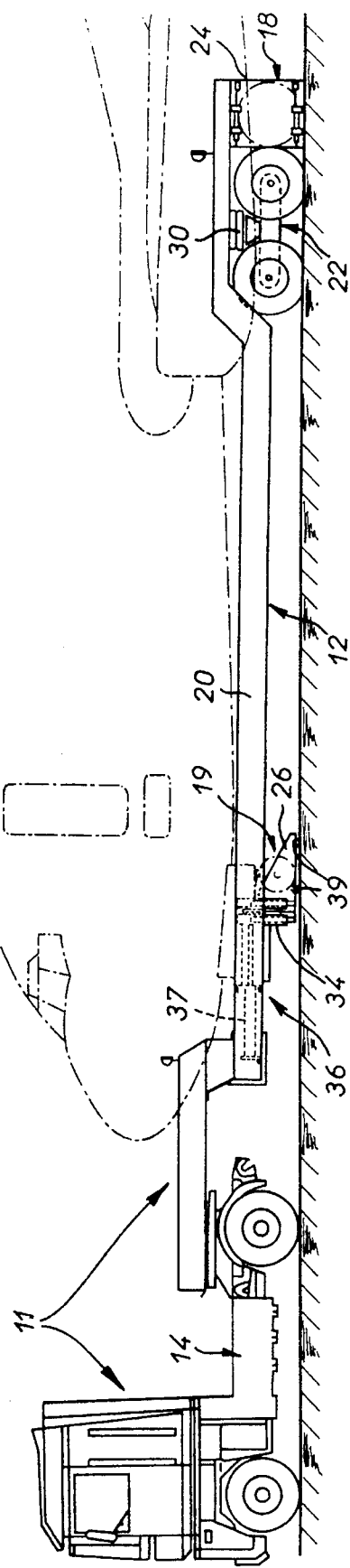
FIG. 1 is a diagrammatic view in elevation of a first embodiment of a transporter vehicle in accordance with the invention, shown during the loading of an aircraft.

The vehicle for transporting an aircraft on the ground shown in FIGS. 1 through 3 and 6 comprises a rolling structure 11 consisting of a trailer 12 coupled to a tractor 14. The tractor 14 may be a semi-trailer tractor. The rolling structure and in particular the trailer 12 is shaped and sized to support an entire aircraft 16, shown in chain-dotted outline in the figures, with all its undercarriage legs supported on it, namely the main (rear) undercarriage legs 18 and the front undercarriage leg 19. To be more precise, the rolling structure comprises an elongate and very low chassis 20 and two sets of wheels 22 at the rear of said chassis. It is therefore adapted to be inserted under the aircraft 16 resting on the ground on its own undercarriage legs 18, 19. The chassis 20 is V-shape (see plan view in FIG. 3); it is coupled at the front to the tractor 14. The two sets of wheels 22 are at the ends of its respective branches. The sets of wheels 22 are in this way near the locations at which the main undercarriage legs 18 are received. To be more precise, each end of a branch of the chassis 20 comprises a cradle 24 onto which a main undercarriage leg 18 is loaded and which is fitted with a mechanism for locking the undercarriage wheels. This particular arrangement is described in more detail with reference to FIG. 6. Forces due to acceleration and deceleration of the transporting vehicle are therefore taken entirely by the main undercarriage legs 18, which are more than adequately rated to withstand them, which is not usually the case with the front undercarriage leg 19. The same chassis 20 also carries a cradle 26 onto which the front undercarriage leg 19 is loaded. It is adapted and positioned near the front of the chassis to support the front undercarriage leg 19. Unlike the main undercarriage legs 18, the front undercarriage leg 19 merely rests on the cradle 26 and is free to move thereon longitudinally and transversely. It is merely retained vertically by a strap 28 or like retaining means provided near the cradle 26. A strap of this kind can be used to attach the front undercarriage leg to the chassis to restrict its vertical movement relative to the cradle. This prevents the aircraft pitching when the transporter vehicle accelerates.

The vehicle further comprises means for raising the cradles 24 and 26 so that the entire aircraft can be lifted. The cradles 24 and 26 can be lowered so that the undercarriage legs of the aircraft can be loaded into their respective cradles. Raising the cradles lifts the aircraft a few tens of centimeters off the ground to enable it to be moved.

With particular reference to raising the cradles 24, the rolling structure comprises pneumatic lifting means 30 disposed between the parts carrying said cradles (the chassis 20) and the sets of wheels 22. These pneumatic lifting means are, so to speak, combined with an inflatable pneumatic suspension system disposed above each set of wheels of the vehicle. As a safety measure the suspension may be mechanically locked in the raised position during transportation.

The cradle 26 onto which the front undercarriage leg 19 is loaded has a shovel-like shape and is coupled to a vertical displacement mechanism 34 operated by jacks. Conjoint action of the lifting means 30 and the mechanism 34 lifts the aircraft whose undercarriage legs have been loaded into the cradles. The cradle 26 and the mechanism 34 constitute a subsystem which is linked to a horizontal displacement mechanism 36 by means of which it may be moved towards the rear by jacks 37. The base of the cradle 26 is provided with rollers 39 which rest on the ground when it is in the lowered position. In this position the base of the cradle is only a few centimeters above the ground. As will be explained later, all these means cooperate to introduce the cradle 26 under the front undercarriage leg 19 without moving the aircraft.

Figure 6:
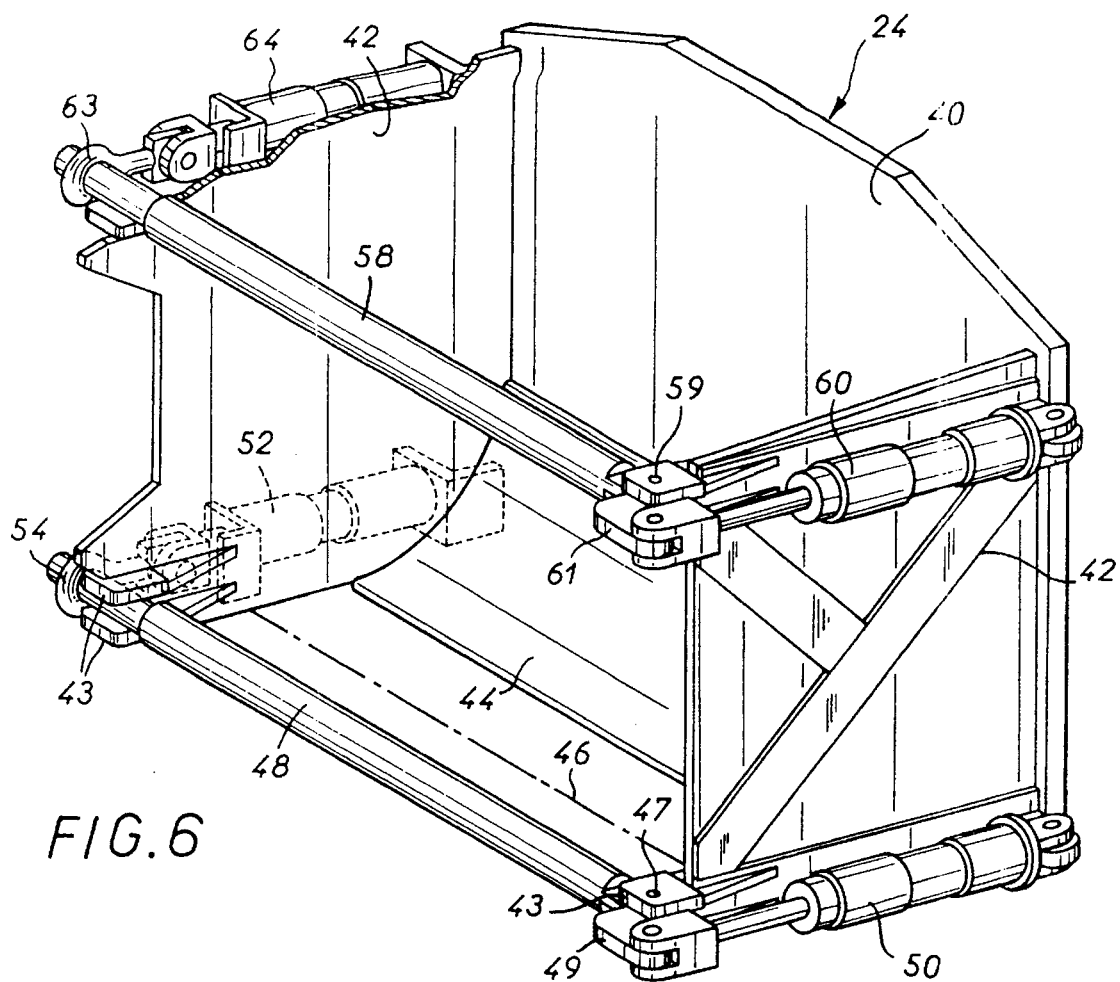
FIG. 6 is a more detailed perspective view showing one cradle onto which a main undercarriage leg is loaded.

The structure of one of the cradles 24 onto which the main undercarriage legs 18 are loaded will now be described with reference to FIG. 6. It has a vertical transverse wall 40 to which are fixed two parallel reinforced side flanges 42. A base 44 is fixed between the transverse wall 40 and the flanges 42 at the bottom of the cradle and the main undercarriage wheels bear against this. The upper surface of the base is advantageously concave (with a cylindrical surface). It can therefore be inserted under the main undercarriage wheels as far as the point at which they bear on the ground with a relatively large surface area in contact with the tire treads. The chain-dotted line 46 in FIG. 6 represents the transverse centerline along which the wheels come into contact with the ground. This is an imaginary line passing approximately through the centers of the areas of the undercarriage wheels resting on the ground when the undercarriage leg is correctly positioned in the cradle lowered to ground level. A mobile bar 48 in the lower part of the cradle is articulated to one flange 42. In the normal position it is parallel to the base 44, under the main undercarriage wheels and on the opposite side of the line 46 to the base 44. In this position the bar is held at the ends in housings cut into the flanges 42 and strengthened by welded-on transverse supports 43. On one side of the cradle the supports 43 form a yoke carrying a vertical shaft 47. The corresponding end of the bar 48 is articulated to this shaft and has a lever extension 49 articulated by a yoke to the end of the piston rod of a ram 50 disposed along the horizontal bottom edge of the flange. A similar ram 52 is disposed along the horizontal lower edge of the other flange 42 but its end carries a locking hook 54 adapted to cooperate with the corresponding end of the bar 48 to hold it into the housing cut out of the flange 42. It is clear that operation of the ram 50 pivots the bar 48 until it is parallel to the flange 42 to enable the undercarriage wheels to enter or leave the space delimited by the wall 40 and the flanges 42 or places it and locks it perpendicular to the two flanges in a position in which it is fitted under the wheels. It is clear that in this latter position raising the cradle 24 lifts the undercarriage leg inserted in it.

A similar arrangement is adopted for a mobile retaining bar 58 disposed parallel to and above the bar 48, above the undercarriage wheels. In brief, the bar 58 is articulated at one end about a vertical shaft 59 and is pivoted via a lever 61 by a ram 60 disposed along one flange 42. The other end of the bar 58 cooperates with a locking hook 63 articulated to the end of the piston rod of a ram 64 disposed along the other flange 42. The bar 58 prevents the undercarriage wheels from being accidentally released from the cradle 24 during transportation. In other words, the cradle 24 incorporates a mechanism for locking the respective main undercarriage wheels essentially comprising the base 44, the bars 48 and 58 and the associated rams.

Figure 2:
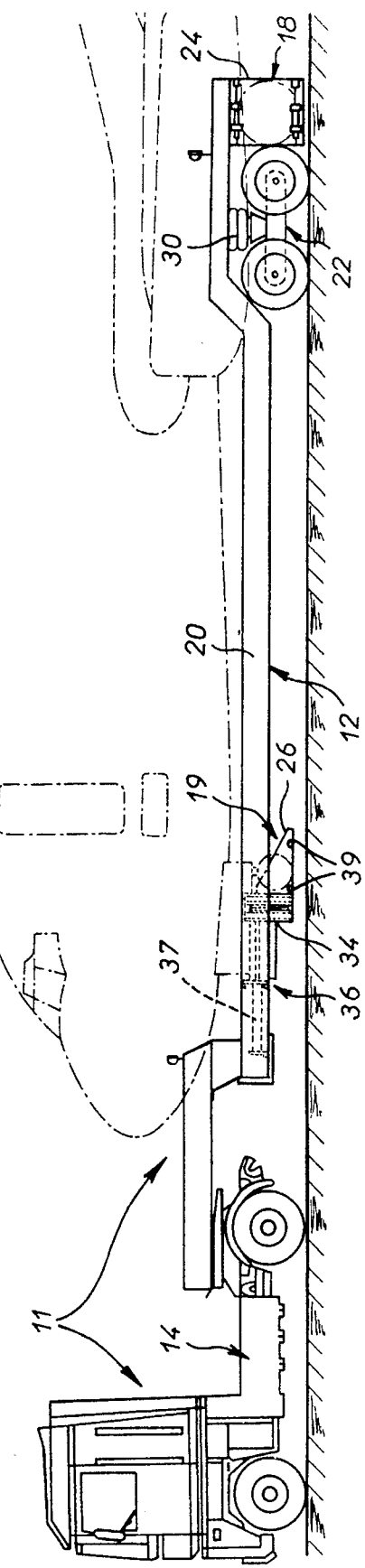
FIG. 2 is a view analogous to FIG. 1 showing transportation of the aircraft.
Figure 3:
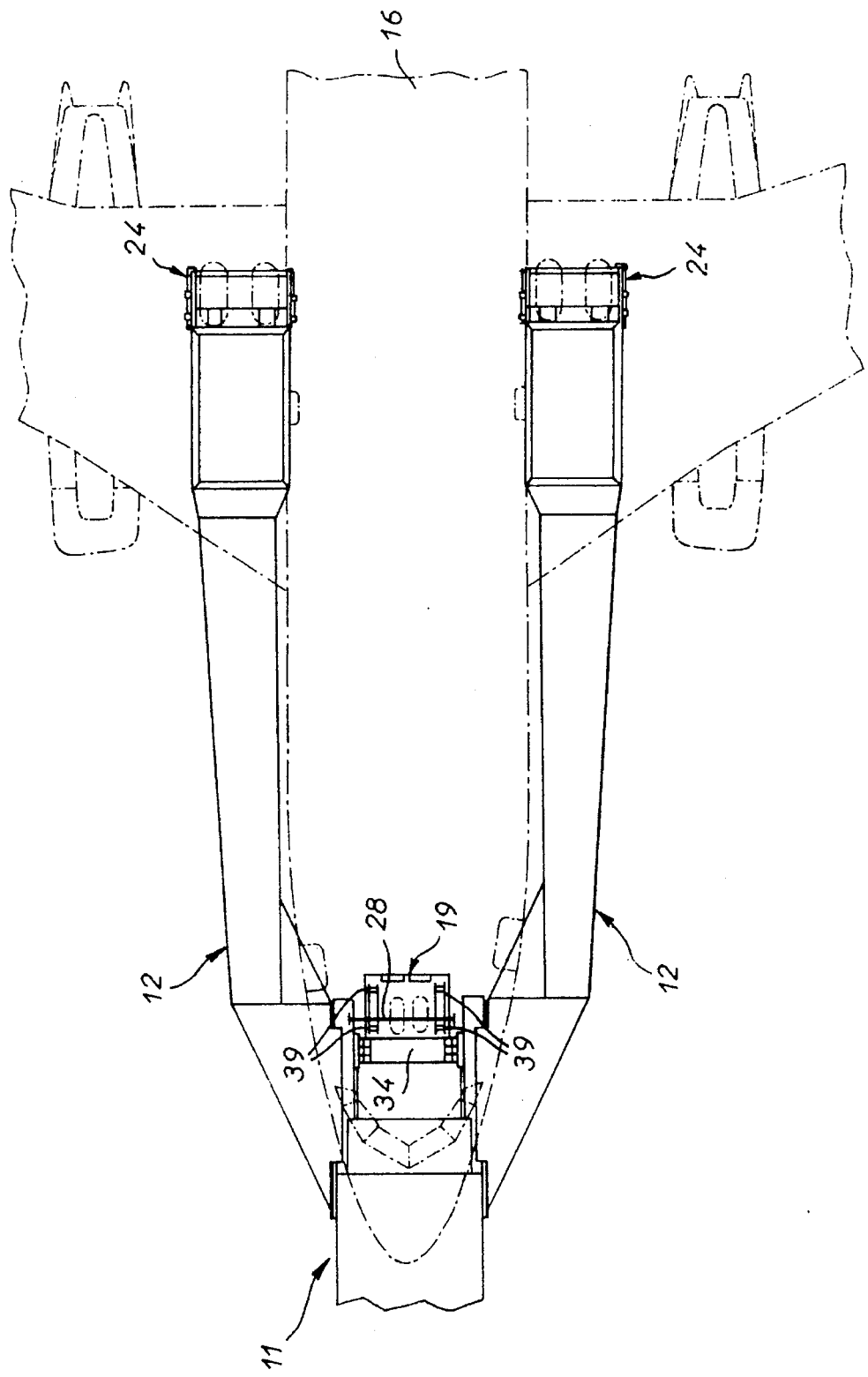
FIG. 3 is a partial plan view of the same transporter vehicle.

In the embodiment shown in FIGS. 1 through 3 the cradles into which the undercarriage legs are loaded are open towards the rear. This means that the two cradles 24 are attached to the chassis 20 in such a way that their sides defined by the bars 48 and 58 are at the rear and that the bottom free transverse edge of the shovel-like cradle 26 is the rear edge of this cradle. As a result, the aircraft is loaded onto the transporter vehicle just described by reversing the vehicle under the aircraft. The loading operation is conducted as follows.

The trailer is reversed under the aircraft from the front of the aircraft. The cradles 24 and 26 are raised. The cradles 24 are open, meaning that the bars 48 and 58 are held parallel to the respective flange 42 by the respective rams 50 and 60. The cradle 26 is moved as far as possible towards the front of the trailer. When the two cradles 24 are near the respective undercarriage legs 18 the rear part of the chassis is lowered (by depressurizing the lifting means 30) until the bases 44 are a few centimeters above the ground. The trailer is reversed until the undercarriage wheels enter the respective cradles 24. The bars 48 and 58 are pivoted and locked into the position shown in FIG. 6. The cradle 26 is lowered to ground level and the horizontal displacement mechanism 36 is operated until the base of the shovel-like cradle 26 is inserted under the front undercarriage leg 19. The aircraft is then lifted by operating the lifting means 30 and the jacks of the vertical displacement mechanism 34. After the front undercarriage leg is strapped down the aircraft may be moved to another location at which it is offloaded by operations which are the converse of those described above.

FIGS. 4 and 5 show another embodiment of a vehicle in accordance with the invention, in this instance a self-propelled vehicle. In these figures subsystems analogous to those of FIGS. 1 through 3 and 6 are identified by the same reference numbers and will not be described in detail again. The rolling structure 11a comprises a chassis 20a which in this instance is generally T-shape as seen from above with two sets of wheels 22 at the rear. Two cradles 24 onto which the main undercarriage legs are loaded are disposed near the respective sets of wheels 22. Pneumatic lifting means 30 are provided between the chassis 20a and the sets of wheels 22.

However, the cradles 24 are disposed and adapted to open towards the front, as is the cradle 26 onto which the front undercarriage leg is loaded, located at the front of the chassis 20. The mechanism 36 for displacing this carriage horizontally is turned around 180 degrees as compared with the previous embodiment. Two sets of steerable wheels 70 are provided near the cradle 26, one on each side of it. A drive and transmission system (not shown) is of course integrated to the chassis 20 and mechanically coupled to the sets of wheels 22. The vehicle is completed by a driver's cab 72 at the front and offset to one side. The locations of the undercarriage wheels in their respective cradles are shown in chain-dotted outline.

The general layout of this self-propelled version makes it easier to load, the vehicle being driven forward under the aircraft from the rear of the aircraft. The parking and locking maneuvers are the same but when the aircraft has been loaded the rolling structure 11a is entirely situated under the aircraft. The combination of the vehicle and the aircraft is therefore more compact and more maneuverable, having a smaller turning circle. This makes the vehicle more flexible to use at airports.

Figure 7:
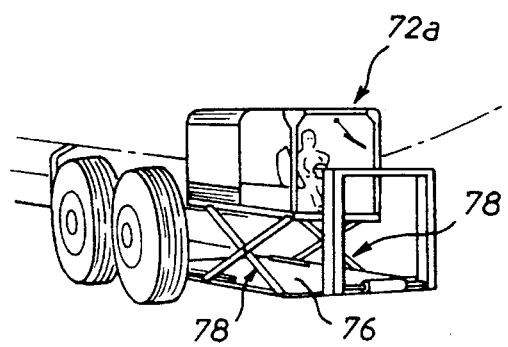
FIG. 7 is a more detailed view in perspective showing an advantageous modification to the driver's cab.

As shown in FIG. 7, the driver's cab 72a may be movable vertically relative to a platform 76 of the chassis. In this example the cab 72a is of rectangular parallelepiped shape and is mounted on scissors type levers 78. The means for operating this system of levers by means of rams are not shown in the drawing. This arrangement enables the cab to be raised to give the driver a better view when transporting an aircraft.

We claim:

1. A vehicle for transporting on the ground an aircraft that has front and rear undercarriage legs and wheels on at least said rear undercarriage legs, the vehicle comprising a rolling structure, front and rear cradle means for said front and rear legs shaped and sized to support the aircraft with said front and rear undercarriage legs on said front and rear cradle means, respectively means (30, 34) for raising and lowering said front and rear cradle means, and mechanisms (44, 48, 58) on only said rear cradle means, for encompassing and locking said wheels of said rear undercarriage legs without moving the plane horizontally, wherein said front cradle means (26) is a shovel coupled to a jack (34) for displacing the front cradle means (26) vertically, and wherein the front cradle means (26) is coupled to a ram (26) for displacing the front cradle means horizontally.

2. A vehicle according to claim 1, wherein said raising and lowering means comprises pneumatic lifting means (30) acting between said cradle means and wheels that support said vehicle.

3. A vehicle as claimed in claim 1, wherein said rear cradle means (24) comprises a base (44) against which said wheels on said rear undercarriage legs are applied, and at least one mobile support bar (48) adapted to be placed parallel to said base under said rear undercarriage wheels, said base (44) and bar (48) being disposed on opposite sides of a line (46) along which said rear undercarriage wheels move along the ground during movement of said vehicle.

4. A vehicle as claimed in claim 3, wherein said rear cradle means comprises at least one mobile retaining bar (58) adapted to be placed parallel to and above said support bar (48) over a said rear undercarriage wheel.

5. A vehicle according to claim 1, further comprising retaining means (28) on the front cradle means (26) for restricting vertical movement of said front undercarriage leg relative to the front cradle means.

6. A vehicle according to claim 1, wherein the front cradle means comprises a base having rollers (39) adapted to roll on the ground.

7. A vehicle according to claim 1, wherein said rolling structure (11) comprises a trailer (12) adapted to be coupled to an independent tractor (14).

8. A vehicle according to claim 1, wherein said rolling structure (11a) is self-propelled.

9. A vehicle according to claim 8, wherein said rolling structure (11a) comprises at least one set of driven wheels (22) disposed adjacent said rear cradle means, and at least one set of steerable wheels (70) near said front cradle means.

10. A vehicle according to claim 9, wherein said cradle means open in a forward direction relative to the direction of forward movement of the plane.

11. A vehicle according to claim 8, which further comprises a driver's cab (72a), and means to move said driver's cab vertically relative to said rolling structure.

\* \* \* \* \*